Patented Mar. 2, 1937

2,072,288

UNITED STATES PATENT OFFICE 2,072,288

WATER INSOLUBLE AZODYESTUFFS

Werner Zerweck and Max Schubert, Frankfort-on-the-Main-Fechenheim, Germany, assignors to General Aniline Works, Inc., New York, N. Y., a corporation of Delaware No Drawing. Application October 23, 1935, Serial No. 46,344. In Germany November 8, 1934

4 Claims. (Cl. 260—86)

Our present invention relates to water insoluble azodyestuffs more particularly to those of the general formula:

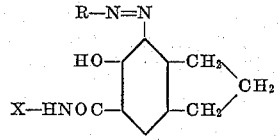

wherein R stands for a radicle of the benzene or diphenyl series not containing a group which renders the azodyestuff water soluble and X means a radicle of the benzene or naphthalene series.

The new azodyestuffs are obtained by combining amides of 5-hydroxyhydrindene-ortho-carboxylic acid as such or on a substratum with diazo-compounds containing no group which renders the azodyestuff water-soluble.

The above amides are obtainable according to application Serial No. 43,510 filed by Werner Zerweck, Ernst Korten and Max Schubert on October 4, 1935, by acting carbon dioxide on 5-hydroxyhydrindene and condensing the ortho-carboxylic acid formed with an amine of the aliphatic, aromatic or heterocyclic series.

When produced in substance the azodyestuffs of the present invention are suitable for the manufacture of valuable color lakes. They are particularly adapted for production on the fiber according to the ice color method or to one of the usual printing processes.

In order to further illustrate our invention the following examples are given, the parts being by weight and all temperatures in centigrade degrees, but it is however to be understood, that our invention is not limited to the particular products nor reacting conditions mentioned therein.

Example 1

A solution of the diazo compound of 13.8 parts of 4-nitraniline is combined with a solution of 25.3 parts of 5-hydroxyhydrindene-ortho-carboxylic acid anilide in a dilute caustic soda solution, to which Turkey red oil and a quantity of sodium acetate, which is sufficient for almost neutralizing the excess of mineral acid, has been added. The separated dyestuff of the formula:

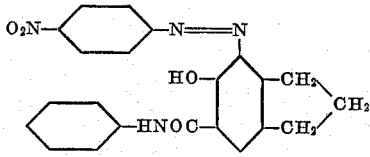

is filtered off, washed out and dried. When mixed with one of the usual substrates it yields a dark brown color lake of a good fastness.

Example 2

Cotton yarn is impregnated with a solution containing per liter 20 grs. of the anilide of 5-hydroxyhydrindene-ortho-carboxylic acid, 30 ccs. of a caustic soda solution of 34° Bé., 20 grs. of sodium chloride and 30 ccs. of Turkey red oil, then the cotton yarn is centrifuged and developed with a diazo-solution prepared from 15 grs. of 1-methoxy-2-benzoylamino-4-chloro-5-aminobenzene per liter, to which sodium acetate has been added. A strong yellowish olive dyeing is obtained. The dyestuff formed on the fiber corresponds to the formula:

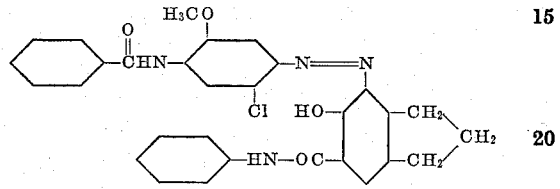

When impregnating the cotton yarn with a solution of the condensation product of 5-hydroxy-hydrindene-ortho-carboxylic acid and 1-amino-2,4-dimethoxy-5-chlorobenzene and developing with the diazocompound of 4-nitro-2-aminoanisol and of 1-methoxy-2-benzoylamino-4-chloro-5-aminobenzene, respectively, the formed dyestuffs of the formula:

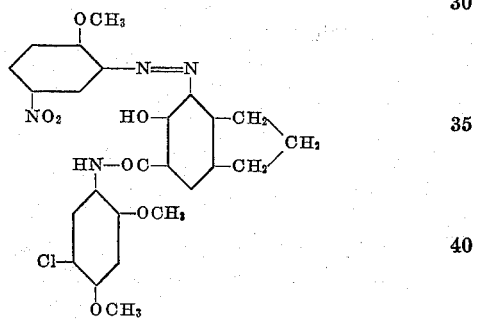

and

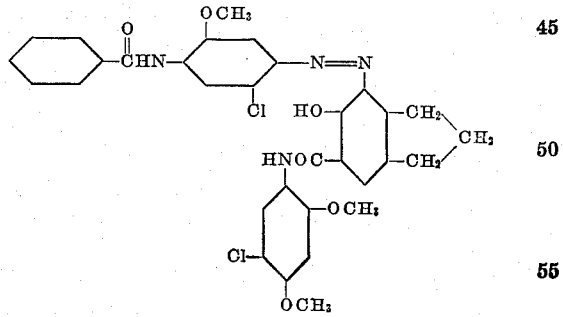

respectively are obtained which dye goods fast greenish olive and yellowish brown shades respectively.

When impregnating the cotton goods with a solution of the condensation product of 5-hydroxy-hydrindene-ortho-carboxylic acid with 1-amino-2,5-dimethoxy-4-chlorobenzene and developing with the diazocompound of 2-amino-4-chloro-diphenylether the formed dyestuff of the formula:

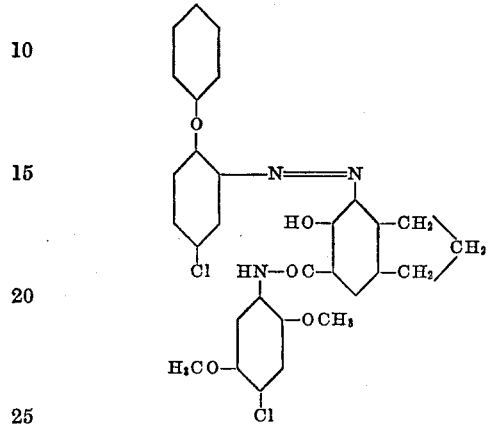

dyes fast olive-brown shades.

The following table shows the shades of some further dyestuffs obtained according to the present process by using

| As diazo component | Condensation product of 5-hydroxyhydrindene-ortho-carboxylic acid with | Shade |
| --- | --- | --- |
| Dianisidine | 2-naphthylamine | Dark brown |
| 2-amino-4,4'-dichlorodiphenyl-ether. | 2-naphthylamine | Blackish brown |
| 4-nitro-2-aminoanisol | 2-naphthylamine | Dark olive |
| 4-nitro-2-aminotoluene | 1-amino-2,4-dimethoxy-5-chlorobenzene | Brown |
| 5-nitro-2-aminoanisol | Dianisidine | Blackish brown |
| 5-nitro-2-aminotoluene | Dianisidine | Blackish brown |
| 4-nitro-2-aminotoluene | Dianisidine | Brown |

We claim:
1. Water insoluble azodyestuffs of the general formula:

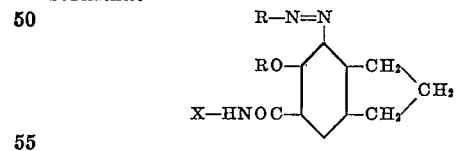

wherein R stands for a radicle of the group consisting of the benzene and diphenyl series not containing a group which renders the azodyestuff water soluble and X means a radicle of the group consisting of the benzene and naphthalene series which dyestuffs are suitable for the manufacture of valuable color lakes and particularly adapted for production on the fiber according to the ice color method or to one of the usual printing processes.

2. A water insoluble azodyestuff of the formula:

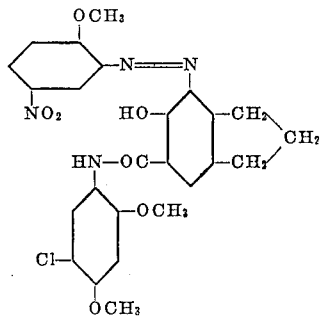

which dyes when produced on the fiber cotton fast greenish olive shades.

3. A water insoluble azodyestuff of the formula:

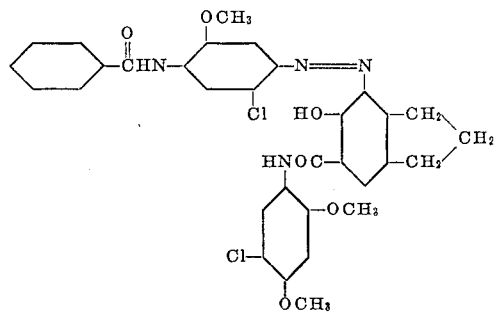

which dyes when produced on the fiber cotton fast yellowish brown shades.

4. A water insoluble azodyestuff of the formula:

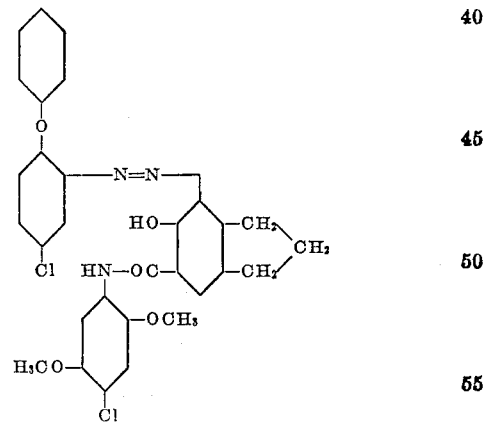

which dyes when produced on the fiber cotton fast olive-brown shades.

WERNER ZERWECK.
MAX SCHUBERT.